Dec. 23, 1941.  A. E. KROGH  2,266,871
REGULATING APPARATUS
Filed Sept. 13, 1938  3 Sheets-Sheet 1
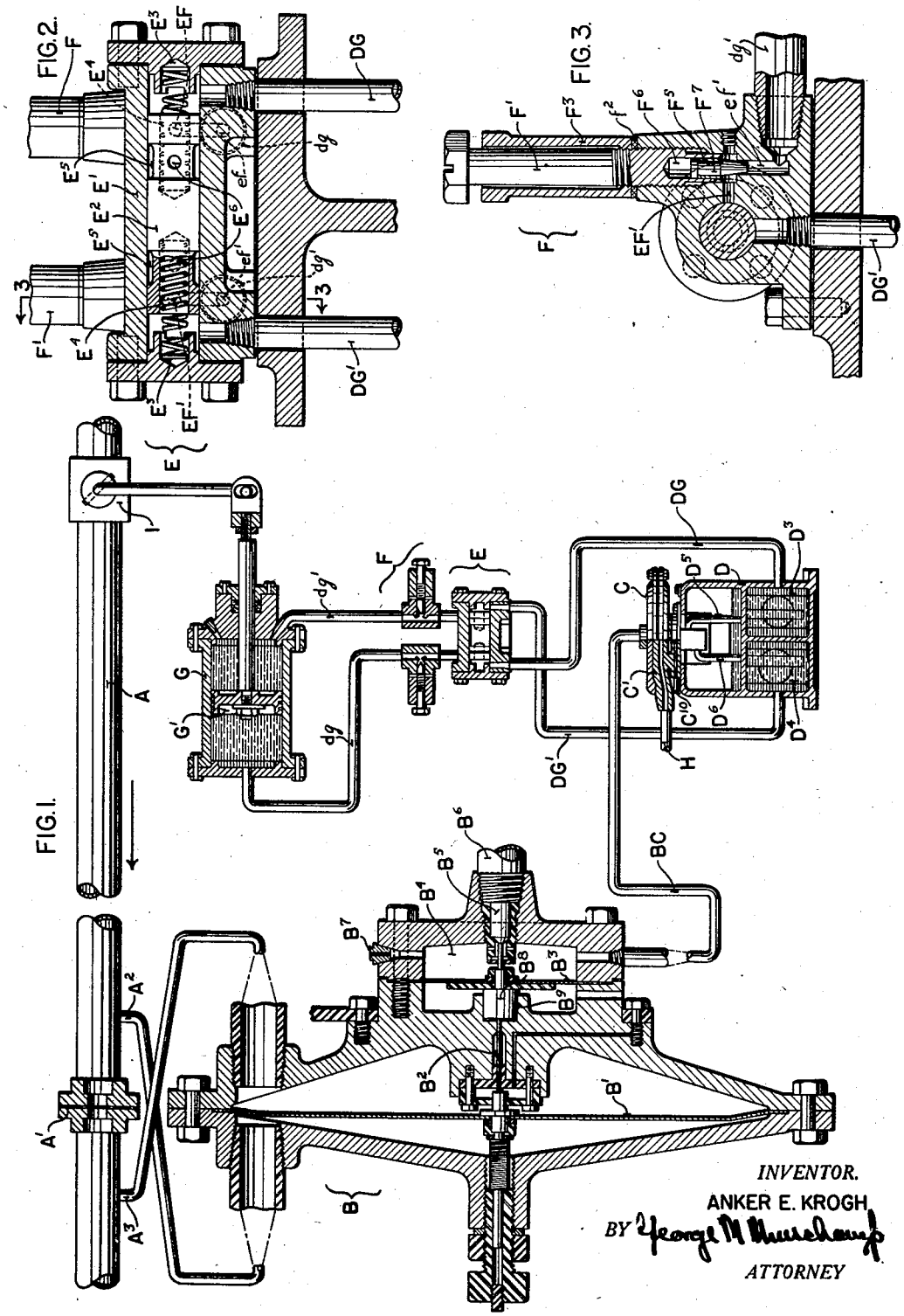
INVENTOR.
ANKER E. KROGH
BY George M. Churchamp
ATTORNEY Dec. 23, 1941.    A. E. KROGH    2,266,871
REGULATING APPARATUS
Filed Sept. 13, 1938    3 Sheets-Sheet 2

INVENTOR.
ANKER E. KROGH
ATTORNEY

Dec. 23, 1941.                A. E. KROGH                2,266,871
                         REGULATING APPARATUS
                        Filed Sept. 13, 1938            3 Sheets—Sheet 3

INVENTOR.
ANKER E. KROGH
BY *George M. Warnedorf*
ATTORNEY

Patented Dec. 23, 1941

2,266,871

UNITED STATES PATENT OFFICE 2,266,871

REGULATING APPARATUS

Anker E. Krogh, Mount Airy, Pa., assignor to The Brown Instrument Company, Philadelphia, Pa., a corporation of Pennsylvania Application September 13, 1938, Serial No. 229,692

6 Claims. (Cl. 121—41)

The general object of the present invention is to provide an improved regulator of the type including a servo-motor and means for controlling the operation of the latter. More specifically, the object of the invention is to provide a regulator of the type specified in which the servo-motor is a reciprocating hydraulic motor, and in which the liquid actuating the motor is subjected to the pressure variations required for the actuation of the motor by variations in the pressure of an elastic fluid admitted to, and exhausted from pressure chambers of the regulator by the actuation of a control valve forming a part of the regulator control means. In ordinary practice, the regulator liquid is oil, and the elastic fluid is air supplied under pressure to the regulator, which is thus an air-hydraulic regulator.

While the control valve of the regulator may be operated manually or automatically in various ways, in the preferred form of the invention, the valve is a fluid pressure motor valve, and is actuated by a variable fluid pressure or, and more usually, by the differential of two fluid pressures, one of which is a master control pressure, and the other of which is a pressure which is a function of the value of the quantity or condition directly or indirectly controlled by the regulator. The master control pressure itself may be controlled either manually, or automatically by means which may be wholly independent, both structurally and operably, from the regulator proper.

The regulator is adapted for use under widely varying conditions and for very different purposes. It is especially well adapted, however, for use in controlling dampers and valves and analogous control elements of combustion control and fluid distribution control systems, and is especially well fitted for such uses by its structural and operative simplicity and reliability, and also because it may readily be designed to provide all the servo-motor power and range of movement required, with a moderate consumption of compressed air supplied to the regulator at a moderate pressure.

The present invention is specifically directed to the combination of an air-hydraulic regulator of the type disclosed in the application of A. J. Fisher, Serial Number 10,778, filed on March 13, 1935, and issued as Patent No. 2,137,607 on Nov. 22, 1938, in combination with a novel form of stabilizer that is used to prevent over-running and hunting of the control portion of the regulator.

Specific objects of the present invention are to provide a stabilizer in which the air pressure that is used to provide power for the servo-motor is also used to prevent hunting of the controller and in which the stabilizer acts directly upon a movable part of the controller.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a somewhat diagrammatic, or schematic, representation of a control system in which a regulator is employed to maintain a constant relation between the fluid flow thru a conduit and a master control pressure impressed on the regulator;

Fig. 2 is a partial section on line 2—2 of Fig. 5;

Fig. 3 is a section on line 3—3 of Fig. 2;

Figure 4:
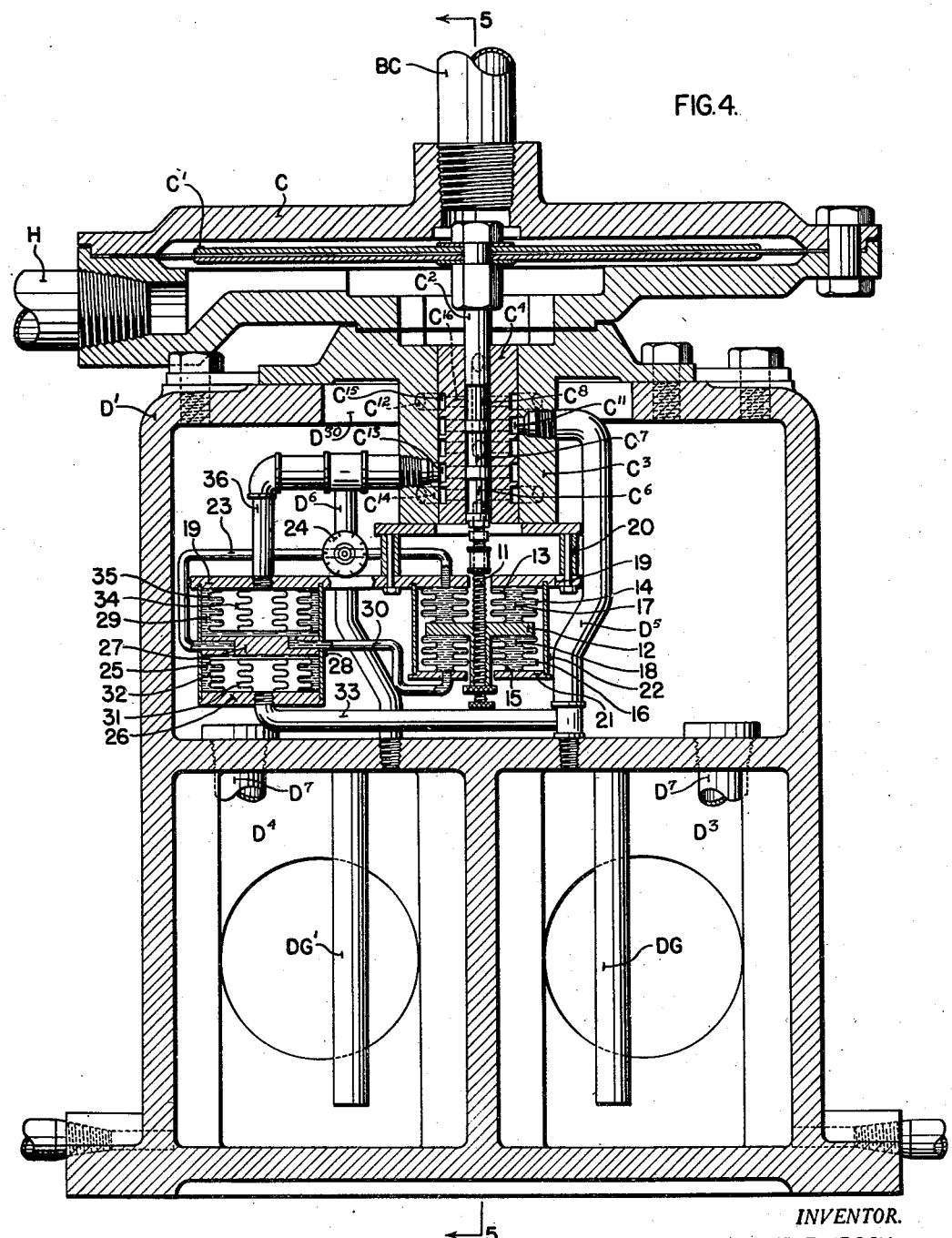
Fig. 4 is a section on line 4—4 of Fig. 5 showing one form of my stabilizer attached to the regulator.

In the apparatus illustrated diagrammatically in Fig. 1, the flow of fluid through a conduit A is made dependent upon the value of a fluid pressure control force, which is not fixed or determined by the apparatus shown in Fig. 1, and may be constant or variable, dependent upon the conditions of use. For example, if the conduit A supplies fluid fuel or combustion air to a furnace, the control pressure force may be automatically dependent upon a pressure, temperature, or other condition or quantity indicative of the furnace combustion requirement.

The apparatus shown diagrammatically in Fig. 1 comprises a device B which may be called a static converter, and serves to establish a fluid pressure regualting force which is a function of the rate of flow through the conduit A. The apparatus shown in Fig. 1 includes a regulating mechanism including elements C, D, E, F, and G, through which on a variation in one direction or the other of said regulating force, relative to a control force transmitted to the regulating mechanism by the conduit H, the element G, which is a fluid pressure servo-motor, is actuated in one direction or the other to thereby effect a compensating adjustment of a flow throttling valve I in the conduit A. This regulating mechanism comprising the elements C, D, E, F, and G, may aptly be termed an air-hydraulic regulator as the elements D, E, and F constitute means for subjecting the motor element G to hydraulic actuating forces created and regulated by pneumatic pressure force controlled by the element C. In the preferred embodiment of the regulating mechanism, illustrated in Figs. 2 to 6, the elements C, D, E, and F are mechanically united in a single compact structural unit, in which the casing of the element D forms a mechanical support for the elements C, E, and F.

The device B, as shown in Fig. 1, comprises a flexible diaphragm B' dividing a pressure chamber into two compartments respectively subjected to pressures which differ from one another by an amount which is a function of the fluid rate of flow through the conduit A. To this end, as shown, the conduit A is provided with a restricted measuring orifice A', and conduits $A^2$ and $A^3$ transmit the static pressures in the conduit A, at the up and downflow sides, respectively, of the orifice A', to the pressure chamber compartments at the left and right, respectively, of the diaphragm B'. An actuating member $B^2$ connected to the central portion of, and extending transversely to the diaphragm B', connects the latter to the central portion of a flexible diaphragm $B^3$. The latter forms the movable wall of a pressure chamber $B^4$. The side of the diaphragm $B^3$ remote from the chamber $B^4$ is exposed to atmospheric pressure. The longitudinal movements of the member $B^2$, control the supply of a pressure fluid to the chamber $B^4$. That pressure fluid supply may advantageously be compressed air supplied from a suitable source, not shown, through a supply pipe $B^6$, at a rate dependent on the position of the valve end $B^5$ of the member $B^2$. $B^7$ represents a bleeder outlet from the chamber $B^4$ through which pressure fluid escapes from the chamber $B^4$ to reduce the pressure in the chamber $B^4$ at a suitable rate when the valve $B^5$ is in its closed position but not rapidly enough to prevent the pressure in the chamber $B^4$ from increasing at a suitable rate when the valve $B^5$ is in its open position.

The effect of the pressure at the upflow side of the orifice A, acting on the left-hand side of the diaphragm B', is normally balanced by the sum of two effects, one of which is the action of the pressure at the downflow side of the orifice A' on the right-hand side of the diaphragm B', and the other of which is the action of the pressure in the chamber $B^4$ on the diaphragm $B^3$. In the normal balanced condition of the device B, the valve $B^5$ is cracked sufficiently to make the rate of flow of pressure fluid into the chamber $B^4$ through the supply pipe $B^6$ equal to the rate of escape of pressure fluid from the chamber $B^4$ through the bleeder outlet $B^7$.

When the rate of flow through the conduit A increases, and the pressure transmitted to the device B through the pipe $A^2$ increases relative to that transmitted by the pipe $A^3$, the valve $B^5$, is given an opening adjustment, and results in an increase in the pressure in the chamber $B^4$ which restores the balance. Conversely on a decrease in the rate of flow through the conduit A, and the resulting decrease in the pressure transmitted by the pipe $A^2$ relative to that transmitted by the pipe $A^3$, the valve $B^5$ is given a closing adjustment, and the pressure in the chamber $B^4$ is diminished to restore the balance. The pressure in the chamber $B^4$ thus is normally in constant proportion to the differential of the pressures at the opposite sides of the orifice A', and therefore is proportional to the square of the velocity of flow through the conduit A. To minimize objectionable fluctuations of the pressure in the chamber $B^4$, the movement of the valve $B^5$ may be retarded by a dashpot action, for which purpose the stem $B^2$ is shown as carrying a piston enlargement $B^8$ working in a dashpot chamber $B^9$ formed in the casing of the device B.

The pressure in the chamber $B^4$ constitutes a regulating force transmitted by the pipe BC to one of the two compartments into which a pressure chamber of the regulator control element C is divided by a horizontally disposed flexible diaphragm C'. The pressure in the other compartment of that chamber is the master control force pressure transmitted to the regulating mechanism by the pipe H. The element C is a fluid pressure actuated control valve, automatically responsive to variations in the differential of the pressure acting on the opposite side of its diaphragm C'.

Figure 5:
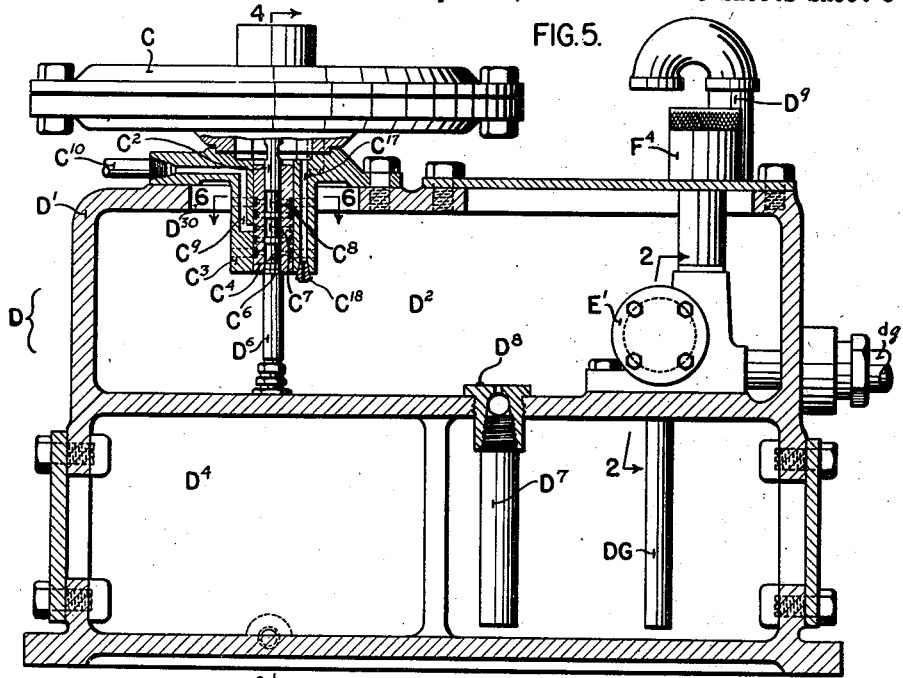
Fig. 5 is a vertical section taken on line 5—5 of Fig. 4, with the stabilizer omitted for the sake of clearness.

In the preferred construction shown in Figs. 4 and 5, the element C is mounted on the top wall D' of the casing of the element D, and includes a valve portion extending into a chamber $D^2$ within said casing through an opening $D^{30}$ in said top wall. Said valve portion comprises a vertical valve plunger or piston valve $C^2$, and a valve casing or housing in which the valve plunger $C^2$ is vertically movable to establish and interrupt communication between various pairs of ports formed in the valve housing. The plunger $C^2$ is connected to and moved by the diaphragm C'. To facilitate its manufacture, the valve housing is formed by an outer tubular shell $C^3$, and a separately formed sleeve member $C^4$ fixed in the shell $C^3$, and the bore of which forms a central valve chamber $C^5$ for the valve plunger $C^2$. The latter is in the form of a cylinder cut away to provide three longitudinally displaced circumferential grooves $C^6$, $C^7$, and $C^8$, each of which, in certain positions of the valve member, establishes communication between corresponding pairs of ports formed in the shell $C^3$ and communicating with the passage $C^5$ through corresponding ports or passages formed in the sleeve $C^4$.

The element C regulates the flow of fluid into and out of, and the fluid pressure within, pressure chambers $D^3$ and $D^4$ of the element D, the chamber $D^3$ being connected by conduit means, shown diagrammatically in Fig. 1 as including pipes DG and dg, to the left-hand end of the cylinder of the pressure motor G, while the right-hand end of that cylinder is connected by conduit means shown in Fig. 1 as including pipes DG' and dg', to the chamber $D^4$. In the arrangement shown, the cylinder of the motor G and the conduits connecting it to the chambers $D^3$ and $D^4$ contain liquid, ordinarily oil, which also fills both of said chambers under static or balanced conditions, under certain operating conditions, however, one or the other of the chambers $D^3$ and $D^4$ is filled partly by liquid and partly by compressed air.

The tubular valve housing member $C^3$ of the controller C is formed with a compressed air supply passage or port $C^9$ connected at its outer end to a source of compressed air (not shown) by a pipe $C^{10}$. At its lower and inner end, the passage $C^9$ communicates through a passage space in the sleeve $C^4$ with the valve chamber $C^5$ at a level midway between the top and bottom of the valve groove $C^7$ when the plunger $C^2$ occupies its neutral position shown in Figs. 4 and 5. At this point it may be explained, that the lower end of the passage $C^9$, as well as each of the hereinafter mentioned ports $C^{11}$, $C^{12}$, $C^{13}$, and $C^{14}$ in the tubular housing member $C^3$, communicates at its inner end with the valve chamber $C^5$ through a corresponding circumferential groove or passage $C^{15}$ and a plurality of radial ports $C^{16}$ formed in the sleeve member $C^4$, and all at the same level. The described passage and port arrangement insures a relatively large port area directly controlled by the portions of the plunger valve $C^2$ at the ends of its corresponding grooves $C^6$, $C^7$, and $C^8$.

In the particular valve arrangement shown, the chamber $D^3$ is connected by a pipe $D^5$ to a port $C^{11}$ in the valve housing communicating with the valve chamber $C^5$ at a level above that of the port $C^9$, so that a movement of the valve member $C^2$ upward from its position shown in Figs. 4 and 5 will permit the passage of compressed air from the port $C^9$ through valve member passage $C^7$, port $C^{11}$ and pipe $D^5$ into the chamber $D^3$. On a downward movement of the valve member $C^2$ from the position shown in Figs. 4 and 5, valve passage $C^8$ puts port $C^{11}$ in communication with an exhaust port $C^{12}$ in the valve housing above the port $C^{11}$ and opening at its outer end into the chamber $D^2$. The pressure in the latter is atmospheric, as the chamber $D$ is in communication with the atmosphere through the port $D^9$.

As shown, also, the chamber $D^4$ is connected by a pipe $D^6$ to a port $C^{13}$ in the valve housing. Port $C^{13}$ opens to the chamber $C^5$ at a level below that at which the port $C^9$ opens, and on a down movement of the valve member $C^2$ from the position shown in Figs. 4 and 5, compressed air passes from the port $C^9$ through the valve passage $C^7$, port $C^{13}$, and pipe $D^6$ into the chamber $D^4$. On an up movement of the valve member $C^2$ from its position shown in Figs. 2 and 3, the port $C^{13}$ is connected through the valve passage $C^6$ to a lower exhaust port $C^{14}$ which opens at its outer end to the chamber $D^2$.

With the described valve arrangement, an increase in the pressure of the static converter chamber $B^4$ relative to the master controller pressure in the pipe H resulting from an unduly high rate of flow through the conduit A, produces a down movement of the valve member $C^2$. This down movement of the valve member $C^2$, as previously explained, results in the passage of compressed air into the chamber $D^4$ through the flow passage including ports $C^9$ and $C^{13}$ and valve passage $C^8$, and also permits the discharge of fluid from the chamber $D^3$ through the ports $C^{11}$ and $C^{12}$ and valve passage $C^8$. The resultant increase in pressure in the chamber $D^4$ produces a movement of the servo-motor piston G' to the left, and thereby gives a closing adjustment to the valve I. Conversely when the flow through the conduit A and the pressure in the static converter chamber $B^4$ diminish relative to the master control pressure in the pipe H, the valve member $C^2$ is given an up movement which connects the chamber $D^3$ to the compressed air supply port $C^9$ through port $C^{11}$ and valve passage $C^7$ and connects the chamber $D^4$ to its exhaust port $C^{14}$ through port $C^{13}$ and valve passage $C^6$. When the pressure in the chamber $D^3$ is thus increased, the servo-motor piston G' is moved to the right and the valve I is given an opening adjustment to thereby increase the flow through the conduit A.

With the servo-motor controlled in the manner described, the adjustment of the valve I in either direction is continued until the valve reaches the limit of its corresponding adjustment, unless before it reaches said limit the change in the flow through the conduit A is increased or decreased to restore the balance and return the control valve member $C^2$ to its neutral position, and thereby interrupt the operation of the servo-motor.

When compressed air is admitted to either of the chambers $D^3$ and $D^4$, the resultant actuation of the servo-motor displaces oil from the chamber into the servo-motor. When thereafter the supply of compressed air to the chamber is interrupted, and the air pressure in the chamber again becomes equal to that of the atmosphere, as a result of opening the chamber to exhaust or of valve leakage, the chamber refills with oil in consequence of a gravity flow of oil into the chamber from the chamber $D^2$ through a corresponding oil return passage $D^7$ provided for the purpose. The passages $D^7$, one for each of the chambers $D^3$ and $D^4$, are in the form of pipes leading down into said chambers and threaded into openings in the bottom wall of the chamber $D^2$. Each return passage includes a non-return check valve $D^8$ preferably of the ball type and located at the top of the passage. Each such non-return valve serves to prevent outflow of oil into the chamber $D^2$ from the corresponding chamber $D^3$ or $D^4$, when the pressure in that chamber is increased by the admission of compressed air thereto. When oil is being moved to the servo-motor from either of the two chambers $D^3$ and $D^4$, the other discharges oil into the chamber $D^2$ through the corresponding pipe $D^5$ or $D^6$ and corresponding exhaust port $C^{12}$ or $C^{14}$.

In order to prevent over-travel of the plunger or slidevalve $C^2$ and consequent hunting of the system, there is provided a stabilizing unit (Fig. 4) which acts to oppose the movement of the plunger $C^2$ in such a manner that over-travel is prevented. The unit consists of a threaded rod 11, attached to the lower end of the slidevalve, which rod receives on its lower end the collar of a disc 12 that forms a base portion of a pair of expansible chambers 17 and 18. The chamber 17 surrounds the rod 11 and has its side walls formed of the bellows 13 and 14, which are attached at one end to member 12 and at their other end to a support 19 that is spaced from and attached to the outer shell $C^3$ by brackets 20. The chamber 18 is in turn formed by a pair of bellows 15 and 16 that each have one end attached to member 12 and the other end attached to an annular disc 21 which is mounted in spaced relation to the bracket 19 by a cylinder 22. It will be seen from the above that as the disc 12 is moved along with the slide-valve $C^2$, one of the chambers will be expanded while the other is contracted.

A pipe 23, having an adjustable throttling valve 24 in it, connects the interior of chamber 17 with another chamber 25 which is formed of a disc 26 and a disc 27 that are held in spaced relation to each other by a cylindrical member 28 whose upper end is attached to the support 19. In a similar manner, a pipe 30 connects the interior of chamber 18 with the interior of a fourth chamber 29 that is formed by the space between the disc 27 and bracket 19. Located within the chamber 25 and attached to disc 26 are a pair of differential bellows 31 and 32, the interior of the former being in communication with the air pipe $D^5$ by means of a pipe 33. A pair of differential bellows 34 and 35 are also located within chamber 29 and have their open ends attached to support 19. A pipe 36 connects the interior of bellows 34 with the air pipe $D^6$ leading to the space D. The manner in which this arrangement of parts stabilizes the movement of the slide-valve $C^2$ will be described in connection with a general summary of the operation of the device below.

The movement of the valve member $C^2$ away from a previous position in which it connected the supply passage $C^9$ to one or the other of the chambers $D^3$ and $D^4$ should terminate the movement of the piston $G'$. Drift of the piston $G'$ or movement of the latter as a result of pressure variations in the chambers $D^3$ and $D^4$, other than those produced by the adjustment of the valve members $C^2$ to connect one chamber or the other to the air supply passage $G^9$, is prevented by the regulator element E. The latter tends at all times to assume a condition in which it prevents flow of oil into or out of either end of the cylinder of the fluid pressure motor G. As diagrammatically shown in Fig. 1, the locking element E is mechanically connected to the element D only through the conduit or pipe sections DG and DG'. In the unit construction shown in Figs. 2–6 inclusive, however, the element E is located within the chamber $D^2$, and is mounted on the bottom wall of that chamber.

The locking element E is, in effect, a fluid pressure valve comprising a valve chamber $E'$ and a piston valve member or plunger $E^2$ mounted therein. The plunger $E^2$ is normally held in the intermediate position shown in Fig. 2 by springs $E^3$ acting on the opposite ends of the plunger $E^2$ which has its ends formed with recesses $E^4$ into which the springs $E^3$ extend. Each spring $E^3$ is stiff enough to prevent it from being compressed by the plunger, except when the opposite end of the plunger is subjected to a fluid pressure but little less than the normal compressed air pressure in the control valve supply passage $C^9$. In the regulator unit of Figs. 2–6, pipes DG and DG' are short vertical pipes which connect the opposite ends of the chamber $E'$ to the chambers $D^3$ and $D^4$, respectively, below the minimum oil levels therein.

Radial ports EF and EF' open to the chamber $E'$ adjacent the ends of the latter at which the conduits DG and DG' respectively open to the chamber. In the neutral position of the piston or plunger $E^2$, shown in Fig. 2, the ends of that plunger extend across and close the ports EF and EF'. When one of the chambers $D^3$ and $D^4$, for example, the chamber $D^3$, is connected to the compressed air supply passage $C^9$, the pressure then transmitted through the pipe DG to the right-hand end of the chamber $E'$, as seen in Fig. 2, moves the plunger $E^2$ to the left to uncover the port EF. This permits the passage of oil from the pipe DG through the corresponding end of the cylinder $E'$, port EF, and pipe dg to the corresponding end of the cylinder of the motor G. The piston $E^2$ is formed with a piston groove $E^5$ adjacent each end and with radial ports $E^6$ leading from each groove $E^5$ to the corresponding recess $E^4$. When the piston valve $E^2$ is moved to the right as seen in Fig. 2, thereby uncovering the inner end of the port EF', and placing the latter in communication with the pipe DG', the port EF is placed in communication with the pipe DG through the right-hand piston groove $E^5$ and the corresponding ports $E^6$ and recess $E^4$. Displacement of the valve member $E^2$ similarly connects the pipes DG and DG' to the ports EF and EF', respectively.

Each of the pipes dg and dg' is shown in Fig. 1 as including a corresponding throttling device F, which is mechanically separate from the elements D and E. In the regulator unit construction shown in Figs. 2–6, however, the pipes dg and dg' are mechanically connected to the casing of the element E and communicate with the ports EF and EF', therein, through respective casing passages or ports ef and ef'. The regulating element F associated with the pipe dg, is a tapered plunger or needle valve axially adjusted to extend a variable distance into and correspondingly throttle the passage ef connecting the port EF to the pipe dg. The regulating device F associated with the pipe dg' similarly throttles the passage ef' connecting the port EF' to the pipe dg'. Each of the devices F is secured in the end of a regulating screw $F'$ threaded into a threaded opening in the casing of the member E coaxial with the corresponding passage ef or ef'. Leakage out of the casing along either screw $F'$ is prevented by a gasket $f^2$ surrounding the screw and compressed between a seat portion formed on the casing and a sleeve member $F^3$ surrounding and threaded on the portion of the screw $F^1$ extending away from the casing of the member E. Each screw F and corresponding sleeve member $F^3$ extends through the top wall $D^1$ of the chamber $D^2$, and advantageously is covered by a removable hood or cap member $F^4$.

Screw $F^1$ is provided with a portion $F^5$ forced into the space $F^6$ at its lower end. The portion $F^5$ provides a ledge on which throttling member $F^7$ rests, the said ledge forming a lower limit stop for member $F^7$. Member $F^7$ is permitted to rise off the said ledge upon a reverse flow, as for example, a flow from passage ef' into passage $EF^1$ in Fig. 3. The provision for movement of member $F^7$ is practically important in that it permits flushing of its valve seat to remove any particles collected thereon. Furthermore, with this construction only one member F at a time is operative, during the actuation of piston $G^1$, to throttle the flow to the piston cylinder G thereby facilitating variation of the speed of piston $G^1$ in one direction in response to a given pressure change in a chamber $D^3$ or $D^4$ from the speed of piston $G^1$ in the other direction in response to an equal and opposite pressure in the other of said chambers. The latter is practically important because of the variation in frictional or like characteristics of the moving parts of the system necessitating individual adjustment of the rate of flow to either side of piston $G^1$.

The axial adjustments of the regulating members F determine the rate of oil flow between the chambers $D^3$ and $D^4$ and the ends of the cylinder of the fluid pressure motor $G^1$, and thereby determine the rapidity or sensitiveness of the control system by which the adjustment of the damper I is varied in response to a variation in the relation between the master control pressure transmitted by pipe H, and the rate of flow to the conduit A.

In the preferred construction illustrated, a vertical passage $C^{17}$ formed in the shell portion $C^3$ of the valve housing opens at its upper end into the pressure chamber beneath the diaphragm $C^1$ to which the master control pressure is transmitted by the pipe H. At its lower end, passage $C^{17}$ is provided with a restricted outlet $C^{18}$ shown as formed by an axial passage through a plug screwed into threaded lower end of the passage $C^{17}$. The restricted passage $C^{18}$ serves for the escape of entrained moisture carried into the pressure chamber beneath the diaphragm $C^1$, or formed in that chamber by condensation.

In operation any change in the volume of the flow through pipe A will cause a change in the position of diaphragm B'. This in turn alters the position of valve $B^5$ to vary the air pressure in line BC and to vary the position of diaphragm C'. Since the pressure of the air in line H is a constant or a reference pressure, any variation in the pressure of line BC will cause a change of position of diaphragm C' to raise or lower plunger $C^2$, thus permitting air under high pressure from pipe $C^{10}$ to go to either chamber $D^3$ or $D^4$ where it acts on the fluid in that chamber and forces the fluid into one end or the other of cylinder G. The piston G' is thus moved and, in turn, adjusts damper I to regulate the flow through pipe A.

If, for example, the diaphragm C' raises plunger $C^2$, air will enter from pipe $C^{10}$ to passage $C^9$, groove $C^7$ and pipe $D^5$ to chamber $D^3$. At the same time, the chamber $D^4$ will be placed in communication with the atmosphere. Upward movement of plunger $C^2$ will move disc 12 upwardly and compress chamber 17, thus forcing fluid from that chamber through pipe 23 and valve 24 to chamber 25. The same movement of the plunger will elongate chamber 18 and draw fluid to that chamber from chamber 29. This action of forcing fluid from chamber 17 into chamber 29 through the valve 24 amounts to that of a dash-pot and slows up the movement of the slide valve $C^2$ and has a tendency to prevent over-travel by it.

As the air under pressure flows from pipe $C^{10}$ to chamber $D^3$, it will force liquid into cylinder G to adjust the damper I in a direction to return the flow in pipe A to normal. The air passing through pipe $D^5$ will also create a pressure in line 33 and bellows 31 to tend to expand that bellows and force fluid back through pipe 23 and valve 24 into chamber 17 with the same retarded action that it had in going from chamber 17. The bellows 31 can only expand until its top wall reaches and engages with partition 27, which acts as a stop. Since the bellows 31 were originally in engagement with partition 27 and are returned to that engagement, the same amount of fluid will flow in both directions, and the valve $C^2$ will be brought back to its neutral position.

If the original upward movement of valve $C^2$ is small, this stabilizing action and return of the valve to its original position will take only a short time. If, however, the movement of valve $C^2$ is large, it will tend to move in a series of steps since the air pressure in bellows 31 will tend to force fluid back through the pipe 23 and then be overcome by the continued movement of the valve. Eventually the pressure in bellows 31 will overcome the decrease in pressure above the diaphragm C' and force liquid back through pipe 23 to chamber 17 to move the valve $C^2$ to its original position. This action may be assisted by an increase in pressure over the diaphragm C' as a result of the corrective action of damper I. Thus a stabilizing action is produced by retarding the flow of fluid in each direction as it passed through pipe 23 and valve 24. The amount of the retarding or dash-pot action on the slide valve $C^2$ may be regulated by changing the opening of the valve 24. This adjustment is made with respect to the particular process with which the apparatus is being used. For an original downward movement of the plunger $C^2$, the opposite of the above-described operation will take place.

Figure 7:
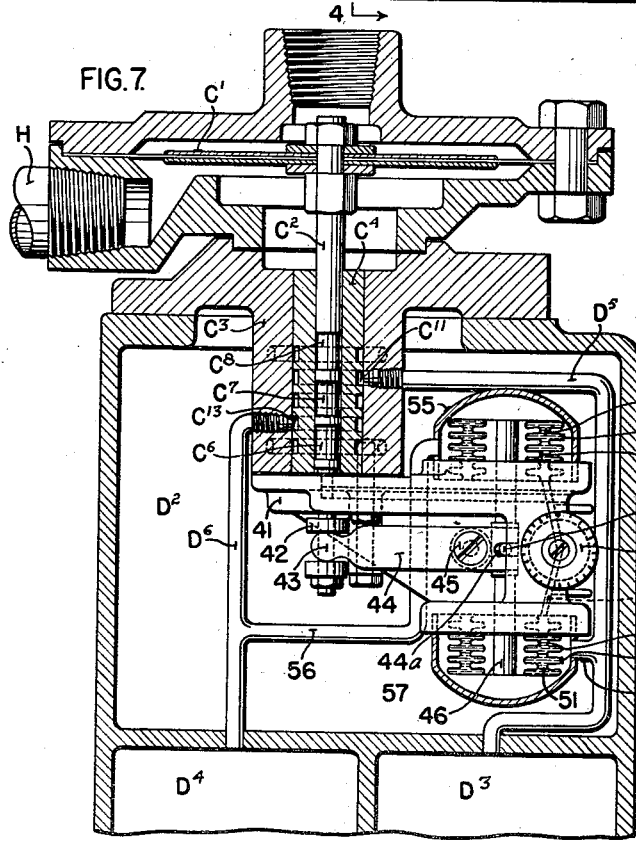
Fig. 7 is a view corresponding to Fig. 4 disclosing a modified type of stabilizer.
Figure 6:
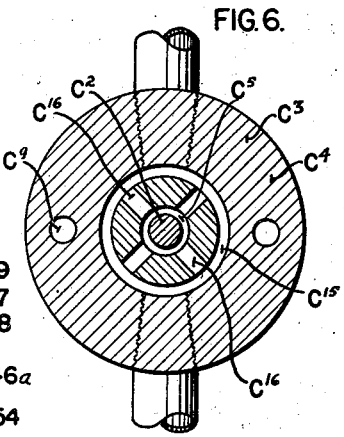
Fig. 6 is a horizontal section taken on line 6—6 of Fig. 5.

In Fig. 7, there is disclosed another type of stabilizer for accomplishing the same effect. This form of the stabilizer is in some respects simpler and more economical to build than that in Fig. 4. Attached to the bottom of shell $C^3$ is a bracket 41 which has a hole in it through which an extension of plunger $C^2$ may pass. Adjustably fastened at spaced points on this extension are washers or guides 42 which receive between them the rounded head 43 of a lever 44 pivoted at 45 on the bracket 41. The other end of the lever is formed with a slot 44a that receives a pin 46a on a vertically extending rod 46. The rod 46 passes through openings in the upper and lower surfaces of bracket 41 and is joined at each end in some suitable means such as soldering to the ends of pairs of bellows in a manner now to be described. On the upper surface of bracket 41 are fastened the lower ends of a pair of concentric bellows 47 and 48 whose upper ends are joined as shown and attached to rod 46. A chamber 49 formed by the bellows is joined by a pipe 50, containing an adjustable valve 54, to a similar chamber 51 formed by a pair of bellows 52 and 53 that are attached at their upper ends to the lower surface of bracket 41. The lower ends of bellows 52 and 53 are joined together and fastened to the lower end of rod 46.

The upper pair of bellows are covered by a cap 55 that is fastened to the surface of bracket 41 in an air-tight manner, which cap has an opening in it that receives one end of a pipe 56, the other end of which communicates with pipe $D^6$. In a like manner, the lower pair of bellows are covered by a cap 57 that is fastened in an air-tight manner to the lower surface of bracket 41, and that is connected by a short pipe 58 with pipe $D^5$.

The operation of this type of stabilizer is very similar to the form disclosed in Fig. 4. When, upon a variation in the flow in the pipe A, air pressure is reduced above the diaphragm C', the plunger or slide valve $C^2$ will rise and permit air to flow into pipe $D^5$ to force oil from chamber $D^3$ to cylinder G so that the damper I will be adjusted. This same movement turns lever 43 around its pivot 45 and forces rod 46 downwardly to expand chamber 51 and draw fluid into it from chamber 49 past the valve 54. The retarding action of valve 54 will slow down the movement of plunger $C^2$ and prevent it from over-traveling. At the same time the above is taking place, air passing through pipe $D^5$ will create a pressure in branch 58 and the cap 57. The increase in pressure in the cap 57 will collapse bellows 52 and 53 to force the liquid therein back through valve 54 to the chamber 49 with the same retarded action that it had going from chamber 49. Thus, the action of the valve $C^2$ is stabilized, and the valve itself is brought back to its neutral position with the damper I adjusted to keep the flow at its normal value. In this embodiment of the invention, as in the previous one, the change in pressure on the upper side of diaphragm C' may assist the pressure in cap 57 to return the valve C² to its neutral position.

As will be apparent to those skilled in the art, the air-hydraulic regulator described herein gives advantages characteristic of control systems which are wholly pneumatic and of control systems which are wholly hydraulic, while avoiding certain objections that are inherent to each of those systems. In particular, the use of my novel stabilizer on such a system insures an accurate setting of the piston in the servo-motor for each change in flow in the conduit A. By the provision of using the air supply that operates the hydraulic system to also operate the stabilizer, I provide a simplified construction that does away with the necessity of an extra air supply for the stabilizer and a system that makes the piping connections to and from the stabilizer devoid of complication. Since the stabilizer acts directly upon the plunger C², its action upon the system as a whole is positive and exact.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control system, a source of pressure fluid, a device adapted to be regulated by a supply of fluid from said source, a member movable in accordance with variations in a measurable condition to regulate the supply of fluid to said device, a part connected with said member to oppose movement thereof, a closed liquid system including expansible chambers and connecting conduits and including movable members operated by the expansion of said chambers to act on said part, and means to direct a portion of the fluid supplied by said member to compress some of said chambers whereby others will be expanded to thereby cause said movable members to move said part.

2. In a control system, a supply of fluid under pressure, a servo-motor actuated by said supply, a movable member to control the admission of fluid to said servo-motor, means to stabilize the movement of said member comprising a part connected to said member, a closed liquid system including expansible chambers and connecting conduits and including movable members operated by the expansion of said chambers to act upon said part in opposition to said first mentioned member, and means to supply a portion of the fluid admitted to the servo-motor to adjust the expansion of the chambers in said liquid system.

3. In an air-hydraulic control system, the combination of an hydraulically operated servo-motor, a supply of air under pressure to control the operation of said servo-motor, a member movable in response to variations in the value of a condition to adjust said supply of air, means to stabilize the operation of said member including a part rigidly attached thereto, a pair of liquid filled expansible chambers acting upon expansion thereof to move said part in one direction, a supply of liquid for each of said chambers, means acted upon by air for said servo-motor in response to movement of said member to force liquid from one said supplies of liquid to one of said chambers to expand the same, and return said part and member toward normal.

4. In a control system, the combination of a servo-motor, a supply of air to operate said servo-motor, valve means movable in response to variations in the value of a condition to be controlled to adjust said air supply, means to stabilize the operation of said valve comprising a part acting on the same to return it toward a normal position, a pair of liquid filled expansible chambers acting on opposite sides of said part upon expansion of the chambers to move said part in one direction or the other, a supply of liquid for each chamber, means to conduct air for said servo-motor, upon operation of said valve, to one of said supplies to force liquid from the same into the corresponding chamber, expansion of the chamber moving said part, and means to variably restrict flow of liquid from one of the supplies to the corresponding expansible chamber.

5. In a control system, a servo-motor, a supply of air to operate said servo-motor, valve means to control said supply of air, means operative in response to variations in the value of a condition to be controlled to adjust said valve in either direction from a neutral position, means to stabilize the operation of said valve comprising a part acting on said valve to return the same toward its neutral position, expansible chambers formed of bellows and each having one end acting on said part and one end fixed whereby expansion of said chambers will produce movement of said part, each of said chambers being supplied with a non-compressible fluid, means to direct air supplied upon movement of said valve to force said fluid from one of said chambers and into the other to move said part, and means to throttle the flow of fluid to one chamber.

6. In a control system, a servo-motor, a supply of fluid under pressure to operate said motor, a valve to control the supply of fluid, means to move said valve in response to variations in the value of a condition which said servo-motor is adapted to control, means to tend to return said valve to a normal position in response to a movement thereof, said means including a part acting on said valve, a pair of separate expansible chambers, each acting to move said part in one direction upon expansion thereof, a supply of liquid for each of said chambers, means operated by fluid to said servo-motor to force liquid from one said supply to its corresponding chamber to move said part, connections between the fluid and said last means being such that the part is always moved toward its normal position.

ANKER E. KROGH.